Figure 1:
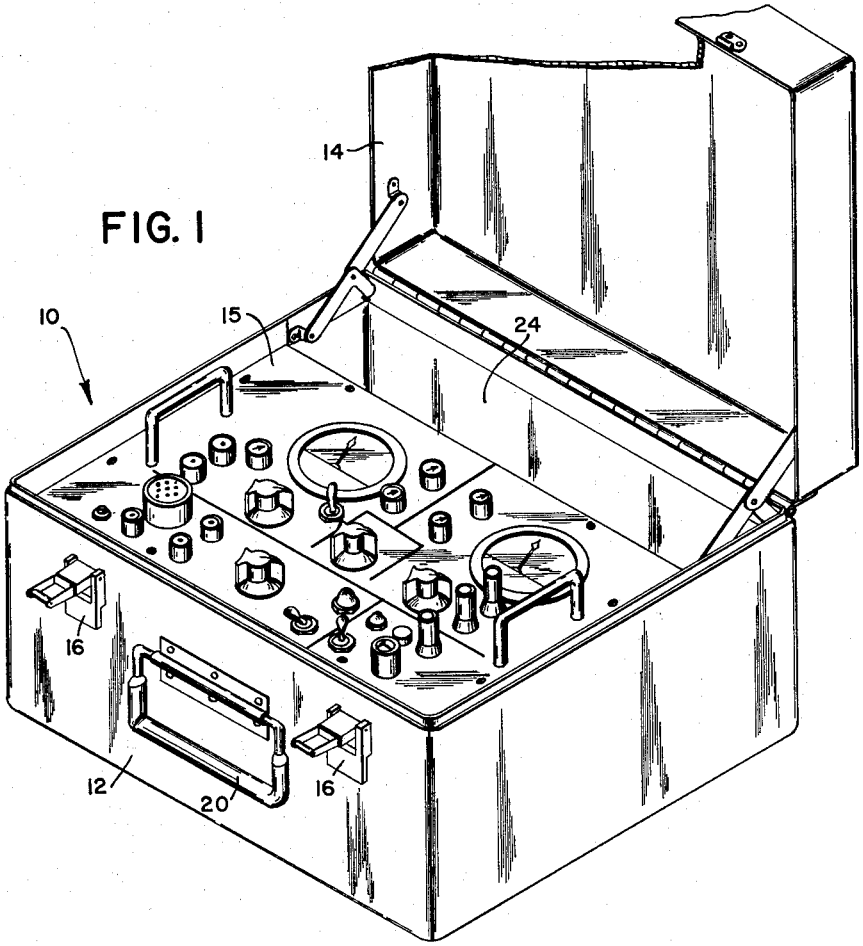

March 30, 1965 L. STAMLER 3,176,221
TEST UNIT FOR AIRCRAFT LIQUID OXYGEN CONTAINERS
Filed Sept. 6, 1960 4 Sheets-Sheet 1

INVENTOR
LEO STAMLER
BY
Leonard H. King

March 30, 1965 L. STAMLER 3,176,221
TEST UNIT FOR AIRCRAFT LIQUID OXYGEN CONTAINERS
Filed Sept. 6, 1960 4 Sheets-Sheet 2
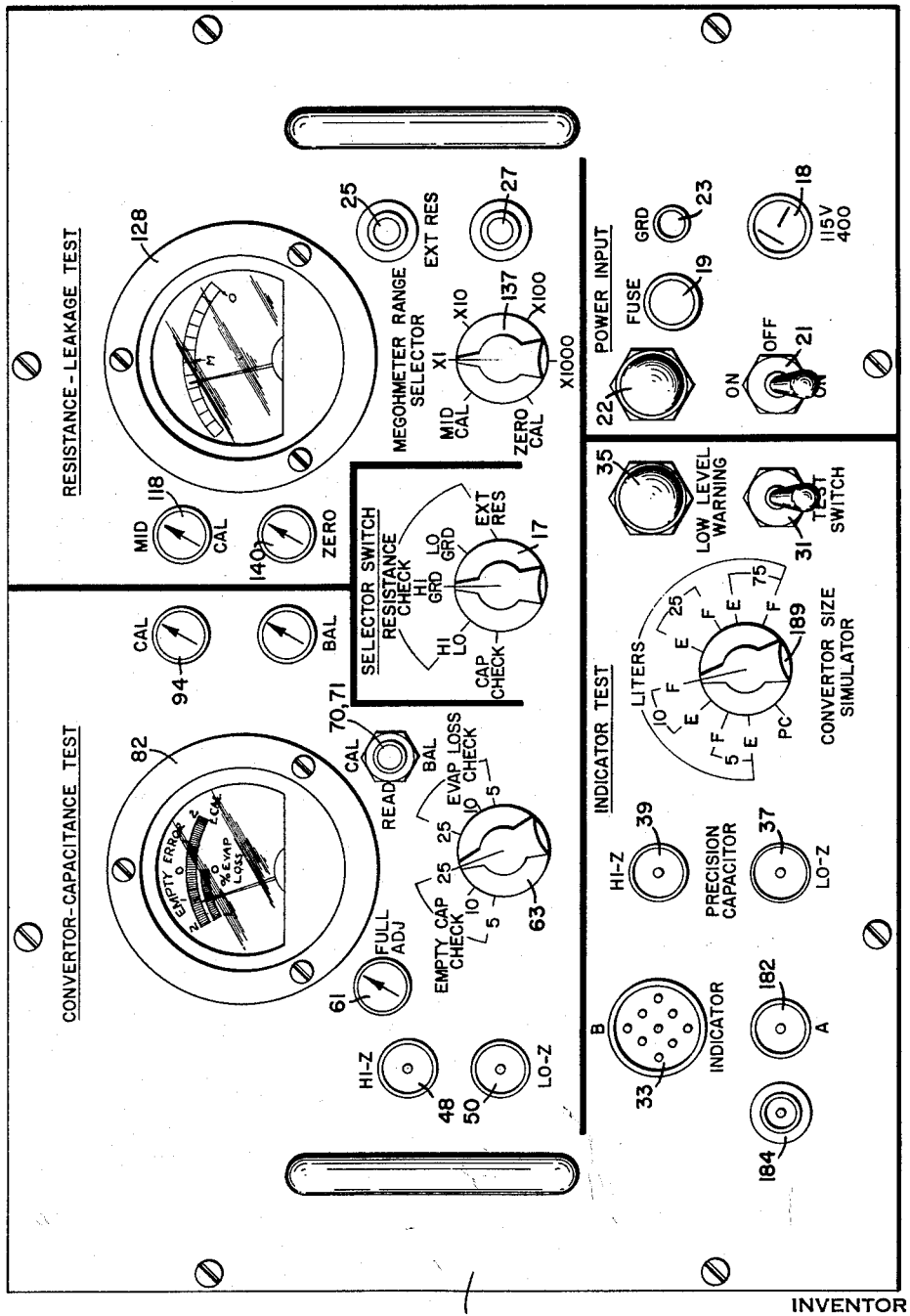
FIG. IA
INVENTOR
LEO STAMLER
BY
Leonard H. King

INVENTOR
LEO STAMLER

INVENTOR
LEO STAMLER

United States Patent Office 3,176,221
Patented Mar. 30, 1965

3,176,221
TEST UNIT FOR AIRCRAFT LIQUID OXYGEN CONTAINERS
Leo Stamler, Plainview, N.Y., assignor to Consolidated Airborne Systems, Inc., New Hyde Park, N.Y.
Filed Sept. 6, 1960, Ser. No. 54,031
6 Claims. (Cl. 324—61)

This invention relates to test units for Liquid Oxygen Containers, and has particular reference to an improved, portable, capacitance-type test system for testing the condition of liquid oxygen containers or converters used aboard an aircraft or similar moving vehicle.

An aircraft utilizing liquid oxygen is generally provided with a heat-insulating liquid oxygen bottle, container, converter, or the like, which is permanently bolted into place in the aircraft. Since liquid oxygen generally exists only at low temperatures, high pressures, or both, it will of course be recognized that such a converter, container or bottle must be particularly constructed to isolate the liquid oxygen from surrounding or ambient temperatures and pressures. Furthermore, such construction must remain within the weight limits determined by the nature of the aircraft.

Conventionally, a liquid oxygen bottle, converter or the like, is provided with a pair of integrally built test probes for rapid check of its condition by an aircraft indicator. The capacitance between the probes is set at a predetermined value, within a predetermined tolerance for an empty converter and for a full converter.

Functional maintenance of a converter (the term converter being hereinafter used to describe any heat insulating liquid oxygen container, bottle, or the like) requires periodic testing of its insulating properties, general efficiency, probe properties as indicated by the capacitance between the probes, and leakage resistance between the probes.

Presently, testing of heat insulating efficiency of liquid oxygen (conventionally abbreviated LOX) converters is accomplished by complete disassembly of the permanently bolted converter from the aircraft and removal thereof to a test area. The converter is weighed with a full load of liquid oxygen, and vented to the atmosphere for an extended period, such as twenty-four hours; the evaporation loss is checked by reweighing the converter. It will be appreciated that this test procedure forestalls frequent routine testing of the converter installation, and requires that an aircraft be idle for excessive periods.

It is accordingly an object of this invention to provide an improved simple, integral, portable unit for testing the efficiency and evaporation loss of a liquid oxygen converter, wherein one section of the unit may be used to calibrate other sections of the unit.

It is a further object of this invention to provide an improved apparatus for testing the condition of an aircraft-installed converter, in its installed position, by testing the converter for its efficiency to determine the correctness of the empty capacitance of the sensing probes and to measure leakage resistance. This test thus determines the accuracy with which the "quantity remaining" information is transmitted from the plane mounted converter to the pilot while in flight.

It is a still further object of the invention to provide a simple portable test unit of the type described to check the accuracy of the aircraft mounted "quantity remaining" indicators.

It is another object of this invention to provide a simple test unit for checking the insulating properties of an aircraft installed converter, which unit is capable of accomplishing the test in a short period of time such as an hour or less.

It is yet another object of the invention to provide a portable system analyzer for liquid oxygen systems using capacitance gauging wherein the tester provides all necessary functions for measurement of probe capacitance, determining evaporation loss, measuring electrical leakage resistance and testing the system indicators.

It is still another object of the invention to provide a tester capable of checking a variety of converters having differing volumes such as, for example, 2.5, 5, 10 and 25 liters.

Yet another object of the invention is to provide a tester that can check indicators used with converters of up to 100 liters.

In accordance with the invention, the tester contains three circuit sections, a converter capacitance section, a resistance leakage section, and an indicator test section. The converter capacitance section provides for measurement of the empty capacitance of LOX probes so as to check for defects in the converter, and for testing of the evaporation-loss-percentage of the converter. The resistance leakage section provides direct readings of insulation leakage resistance between LOX probe electrodes, and between the individual electrodes and ground, and thus checks for defects in the probes. The indicator test section simulates empty, full and, with external equipment, partially full capacitance conditions of LOX tank units to functionally test the aircraft-mounted "LOX quantity remaining" indicator portion of the aircraft liquid oxygen system. As a further feature of the invention, the latter section also provides means for checking the low level warning circuit of the system.

Still other objects and advantages of the invention will become obvious as the following description proceeds. For a more complete understanding of the invention and its operating advantages, refernce may be had to the following description and accompanying drawings wherein a preferred embodiment of the invention is described in detail.

Figure 2:
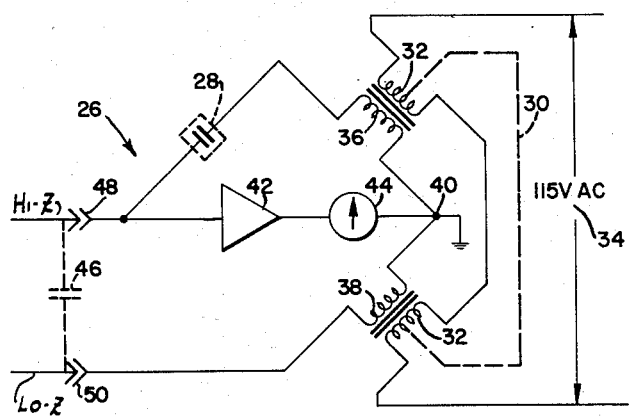
Figure 3:
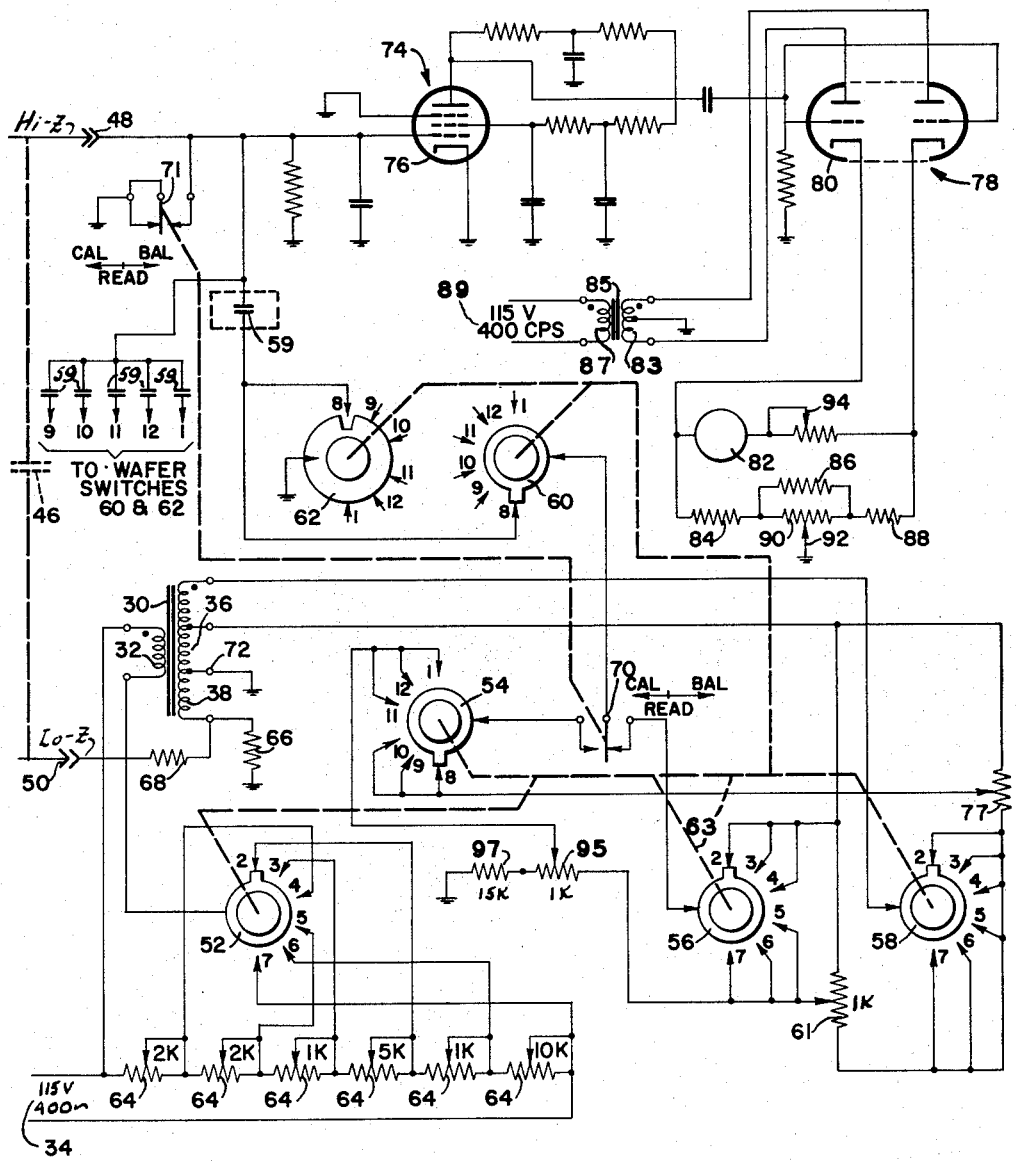
Figure 4:
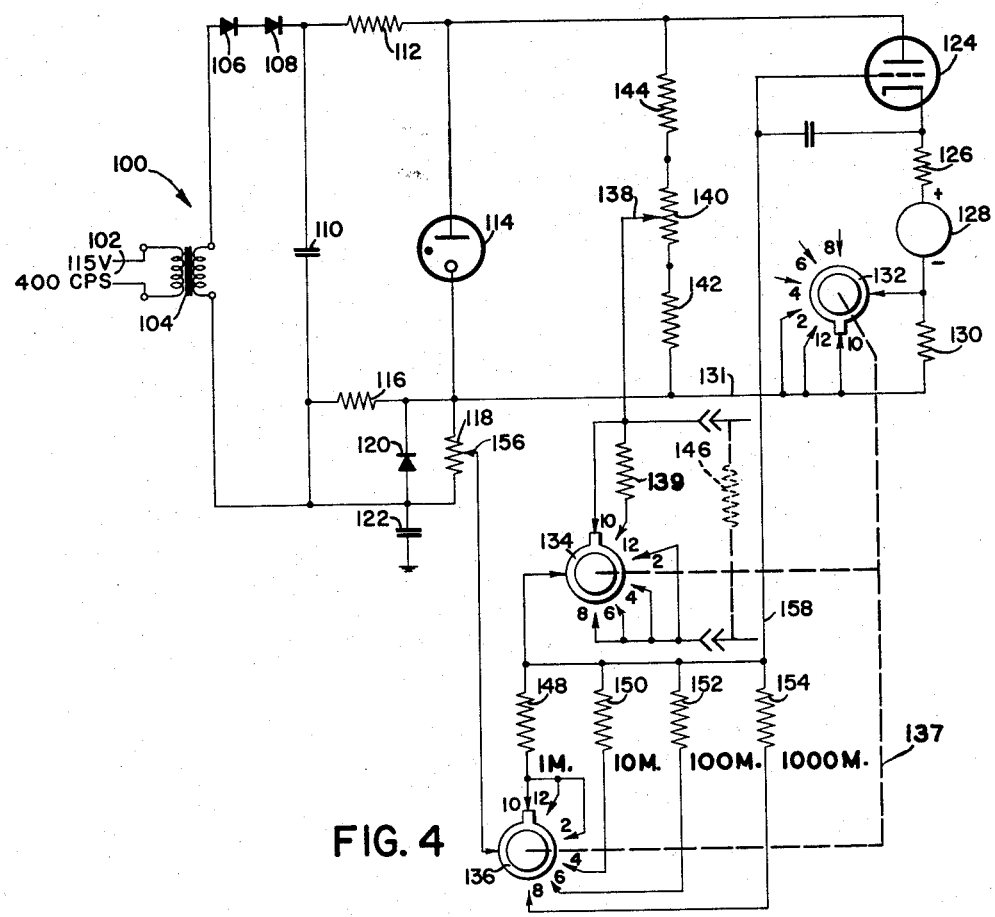
Figure 5:
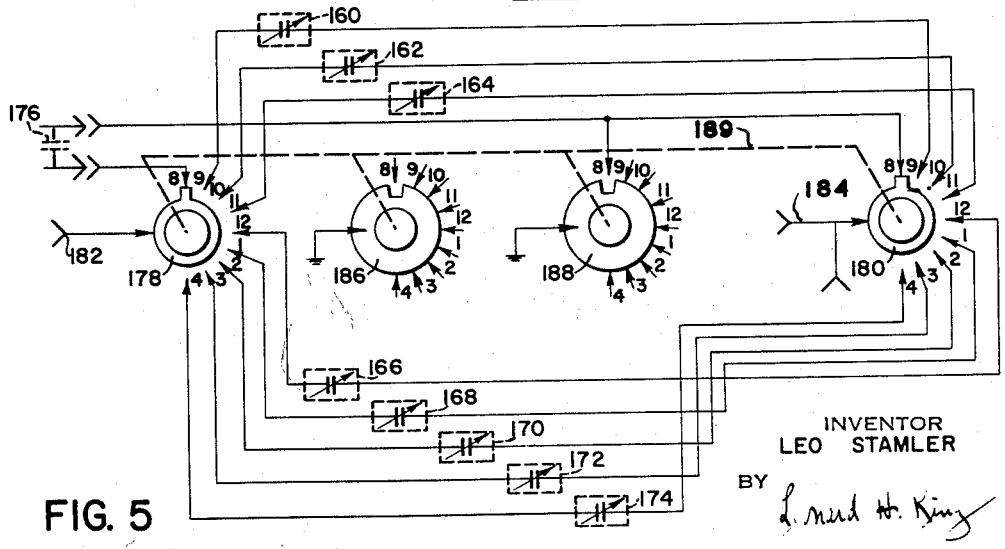

In the drawings:
FIG. 1 is a perspective view of the test instrument in its housing.
FIG. 1a is a front view of the instrument panel.
FIG. 2 is a simplified schematic circuit diagram of one section of the test system of the invention.
FIG. 3 is a more detailed schematic circuit diagram of the test section of FIG. 2.
FIG. 4 is a schematic circuit diagram of the resistance leakage section of the circuit in accordance with this invention.
FIG. 5 is a schematic circuit diagram of the indicator test section of the system in accordance with this invention.

Referring now to FIGS. 1 and 1a, the system analyzer generally designated 10 includes a portable housing base 12 and a pivotally mounted cover 14 which, when open, reveals a panel display 15 having convenient switches and meters to be further described with respect to the schematic illustrations of FIGS. 2–5. Suitable fastening means 16 are provided to hold the cover 14 in a closed position and a carrying handle 20 is suitably mounted to allow portability of the entire system. A cable stowage compartment 24 is provided in the base 12 behind the panel display 15 for convenient placement of test leads and accessories.

The tester 10 is comprised of three circuit sections, a converter capacitance section illustrated in FIGS. 2, 3, a resistance leakage circuit section shown in FIG. 4, and an indicator test section shown in FIG. 5.

The apparatus is constructed to first test the empty-converter capacitance of the liquid oxygen converter, and the empty-converter resistance leakage. An evaporation loss test is then performed on the converters that have successfully passed the empty-converter capacitance and resistance leakage tests.

Each LOX converter is provided with a HI-Z probe connectable to a HI-Z connector 48 in the test unit, and a LO-Z probe connectable to a LO-Z connector 50 in the test unit.

For purposes of switching the probe connectors in the test unit from one circuit to another, circuit selector switch means 17 selectively connect and disconnect the probe connectors to the empty converter capacitance test section in a "Cap Check" position; between the HI-Z and LO-Z probes of the converter in the resistance leakage test circuit, in a "HI-LO" position; between the HI-Z connector 48 and ground, in a "HI-Grd" resistance leakage test position; between the "LO-Z" connector 50 and ground in a "LO-Grd" resistance leakage test position; and across an external resistance in an "Ext-Res" resistance leakage test position.

The converter-capacitance section enables measurement of the empty capacitance of the probes of the LOX converter and the evaporation loss percentage of the converter. The resistance leakage section permits direct readings of insulation leakage resistance between LOX probe electrodes and between each individual electrode and ground. The indicator test section simulates empty, full and (with external equipment) partially full capacitance conditions of LOX units to functionally test the "quantity remaining" indicator of LOX system in the particular aircraft containing the system. It also provides means for checking the low level warning circuit of the system.

The converter capacitance test circuit is essentially comprised of an unbalanced capacitance bridge, a simplified schematic diagram of which is shown in FIG. 2. The basic capacitance bridge, generally designated 26, includes a precision reference capacitor 28 which defines one leg of the bridge.

The instrument is connected to a source of 115 v.–400 c.p.s. power by means of a cable plugged into connector 18. A fuse in series with the connector is supported in fuse post 19. ON–OFF switch 21 is a three-position switch with OFF at the center. In operation, the switch is thrown to the ON position in which the indicator lamp 22 glows. Terminal 23 is used for grounding the set as a generator ground is required for operation.

A transformer 30 includes a single primary winding 32 which is shown in two sections. Two secondary windings 36 and 38 are grounded at a common junction 40 and define effectively two other legs of the bridge. A voltage amplifier 42, connected electrically across the legs of the bridge defined by the reference capacitor 28 and the transformer secondary 36, serves to indicate the potential difference from the reference capacitor 28 to the junction 40 by means of a meter 44. The fourth leg of the bridge is comprised of the capacitance 46 to be tested, i.e., the converter as represented by the capacitance of the converter across its probes and as connected to the HI-Z probe connector 48 and a LO-Z probe connector 50. As stated, these probe connectors are selectively switched from connection with one test circuit to connection with other test circuits by selector switch means 17.

The voltage of the source 34 is inducted into the two secondary windings 36 and 38. If the probe capacity 46 is equal to the reference capacitance 28, the bridge is in balance and no error voltage will appear across the amplifier 42 causing the meter 44 to read zero. Probe capacitances, other than that of the reference capacitance 28, result in an unbalance in the bridge 26 resulting in an error signal at the input of the amplifier 42. The magnitude of the error is proportional to the amount of unbalance and is readable on the meter 44. The phase of the error signal is indicative of the error direction, i.e., + or −, and is also readable on the meter.

Referring to FIG. 3, the converter capacitance test circuit is shown in more detail and includes the transformer 30 having primary winding 32 and secondary windings 36 and 38. At multi-position wafer switch 52, keyed for rotation with wafer switches 54, 56, 58, 60 and 62, forms a single "Empty Capacitance Check–Evaporation Loss Check" selector switch, generally designated 63, which may be operated by a single external knob. The switch 52 connects the primary winding 32 to the source 34 through a selected series of current limiting variable resistance elements 64, each connected in a series with each other. The elements 64 may also be a single fixed tapped divider. The number of series elements 64, and the number of taps, which are switched into the connection between winding 32 and source 34, are determined by the position of the switch 52. Each of the elements 64 is connected as a two-terminal resistance and is selectively adjustable to a predetermined value. The values of the elements 64 are as indicated. The voltage divider system formed by resistors 64 reduces the bridge input voltage to change the bridge gain. The gain change introduced by the voltage divider compensates exactly for the change in the bridge gain inherent when the reference and probe capacitances are changed to a new value (each time the switch 63 is moved). This eliminates the need for varying amplifier gain over wide limits.

The secondary winding 38 (shunted by a temperature compensating 27K resistor 66) and the converter probe 46 are connected to each other by means of a 270-ohm resistor 68 to form a first pair of arms or legs of the bridge 26. One of six reference capacitors 59, selected by means of wafer switch 60, is connected by a single-pole-double-throw selector switch 70 and the wafer switch 56, from the HI-Z end of probes of converter 46 to the winding 36 to form a second pair of arms of the bridge 26. The switch 70 is keyed to a switch 71 with its center position as shown, the switch 71 serving to connect the HI-Z end of probe 46 to ground when thrown to the BAL or Balance condition. Both switches 70 and 71 are shown in the central or READ position. When switch 71 is thrown to the left, or switch 70 is thrown to the right, they merely maintain their READ contacts. The junctions of the two pairs of bridge forming arms are at ground connection 72 at transformer 30 on one side and at the HI-Z end 48 of the probes of converter 46 at the other side. The amplifier 42 and meter 44 which join these two junctions are comprised of an error signal amplifier stage 74, including electron tube 76, which applies its signal to the grids of a phase-and-amplitude detector stage 78, including a double triode tube 80, and a micro-ammeter 82. A grounded-center-tap secondary 83 of a phase-detector plate-supply transformer 85, connected by means of its primary 87 to a 115 v. 400 c.p.s. source 89, is connected at each end to the respective plates of the tube 80. The cathodes of each triode section are connected to ground by means of a voltage-balancing network of resistors 84, 86 and 88, which are connected in series between the cathodes, as shown, and a variable resistor 90 connected across the resistor 86 and having a grounded tap 92. The variable resistor 90 may be pre-adjusted to provide for balanced output from the phase detector 78. The micro-ammeter 82 is series connected with a variable resistor 94 for connecting the meter across the cathodes of tube 80 and for adjusting the sensitivity of the meter.

The transformer 85 supplies opposite phase A.-C. voltages to the plates of phase detector 78. For bridge balance conditions, equal currents flow through each triode section of tube 80 causing a zero voltage across meter 82. For an unbalanced condition, one triode section conducts more than the other and a direct voltage is developed across tube 80. The polarity of this voltage depends on which triode conducts more heavily, and hence upon the phase of error signal. Meter 82 reads upscale for higher than normal converter probe capacity and downscale for lower converter probe capacity.

Potentiometer 77 is a factory set internal potentiometer which is used to adjust the instrument for proper operation when measuring the empty capacitance of probes.

One of the six precision reference capacitors 59 is selected for connection into the bridge 26 by wafer switch 60. Wafer switch 62 grounds the other reference capacitors to prevent interference. The value of capacitance selected in the positions 2, 3, 4, or 8, 9, 10 of wafer switches 52, 54, 56, 58, 60 and 62, which are the Empty Capacitance of "Empty-Cap-Check" positions of selector switch 63, are such that the bridge will be balanced if the capacitance of the appropriate size of empty converter connected by its probes is correct. The three "Empty-Cap-Check" positions represent the different probe capacitances for 5, 10, and 25 liter converters. Readings due to unbalance during empty capacitance checks are read on an "Empty Error" scale of meter 82. The value of capacitance selected in the 5, 6, 7, or 11, 12, 1 positions thereof, is such that the bridge can be balanced by means of the "Full Adjust" control potentiometer 61 when the converter is filled with liquid oxygen. The three "Evaporation Loss Check" positions select precision capacitors that are approximately equal to the full tank probe capacitances of 5, 10 and 25 liter converters. Evaporation of liquid oxygen results in unbalance of the bridge. An "Evaporation Loss Percentage" calibration is suitably provided on meter 82. By "Evaporation Loss Percentage" is meant the quantity of liquid oxygen lost due to evaporation taken as a percentage of initial quantity when test is begun, i.e., directly after balance is set.

Referring to FIG. 4, the resistance leakage circuit, generally designated 100, which is a megohmmeter, comprises generally a regulated half-wave-rectified power supply, a metering circuit and a multiplier circuit. The power supply includes a 115 v. 400 c.p.s. input supply 102 connected by means of a suitable transformer 104 to a pair of half-wave rectifying diodes 106 and 108 and a filter capacitor 110. A dropping resistor 112 supplies the positive voltage on the filter capacitor to the plate of a conventional voltage regulator tube 114. The cathode of the tube 114 is connected to the negative side of capacitor 110 by means of a 10K resistor 116, which is connected in parallel with the outer terminals of a mid-calibrate 10K potentiometer 118 and also in parallel connection with a Zener diode 120 poled opposite to the direction of current flow through the tube 114. A 470 μμf. grounding capacitor 122 serves to connect the negative side of capacitor 110 to the ground. A cathode follower 124 is connected by means of 240K cathode resistor 126 through resistance reading meter 128 and 47K resistor 130 to the cathode potential line 131 of the voltage regulator tube 114.

A plurality of commonly keyed rotatable wafer switches 132, 134 and 136, forming a Megohmmeter-Range selector switch, generally designated 137, serve to allow selection of one of four meter scales and one of two calibration settings. As shown in FIG. 4, the wafer switches 132, 134 and 136 are set in the zero calibration position (10) and for clockwise rotation to the following additional positions (given in sequence): mid-calibrate (12); ohms (read on meter scale) × 1, (2); ohms × 10, (4); ohms × 100, (6); and ohms × 1000, (8). The wafer switches 132, 134 and 136, which are connected to an operator-rotated selection knob, serve to form a voltage divider network from the center-tap or wiper 138 of a potentiometer 140 in series with voltage divider resistors 142 and 144 through the converter resistance 146 through a selected one of a plurality of multiplier resistors 148, 150, 152 or 154, to a centertap or wiper 156 of the mid-calibrate potentiometer 118. A line 158 serves to connect the electrical junction of the resistance 146, and the selected multiplier resistance 148, 150, 152 or 154, to the grid of tube 124. It will of course be understood that the resistance of the converter represented by numeral 146 is connected into the circuit by the selector switch with means not shown. The resistance 146 may represent the HI-Z, LO-Z across the probe connectors 48, 50, or it may represent the resistance from either probe connector 48, or 50 to ground.

A small adjustable negative bias is supplied to the grid of tube 124 from the tap 156 of the mid-calibrate potentiometer 118 through one of the four multiplier resistors 148, 150, 152 and 154, selected by the wafer switch 136 which is designated the "Megohm Range Selector" switch on the panel in FIG. 1a. Zener diode 120 regulates the potential across potentiometer 118.

In setting the Resistance Leakage Circuit, two points of calibration are provided, Zero Calibrate and Mid-Calibrate. Zero Calibrate is provided by the Zero Calibrate potentiometer 140 which serves to set the pointer of the meter 128 to zero. As previously mentioned, Mid-Calibrate potentiometer 118 serves to adjust the meter pointer to the mid-scale dial value. With the Megohm Range selector switch set in the Zero Calibrate position, i.e., wafer switches 132, 134, and 136, all set at (10), the grid of tube 124 is connected to the tap 138 of the potentiometer 140 and to the resistor 148 to the tap or wiper 156 of the potentiometer 118. This configuration results in a potential at the grid of tube 124 which is determined primarily by the voltage at potentiometer 140. The potentiometer 140 is adjusted for sufficient cathode current to cause full-scale deflection of meter 128.

With the wafer switches 132, 134 and 136, all set at position (12), i.e., the Mid-Calibrate position, a 1 megohm resistor 139 of equal value with resistor 148, is placed in series with the tap 138 of potentiometer 140. Resistor 148, however, remains in the circuit. Since resistor 139 and 148 are of equal value, the resulting potential at the grid of tube 124 is approximately one-half the potential supplied during the Zero Calibration configuration. Potentiometer 118 is adjusted to cause the required amount of cathode current to produce half scale deflection of meter 128.

With an unknown resistance such as 146 connected across the HI-Z and LO-Z connectors, the circuit operation is similar to the Mid-Calibration configuration except that the unknown resistance 146 is substituted for resistor 139. The unknown resistance causes a proportional cathode current and hence a proportional meter reading. There are four ranges provided for checking unknown resistances, X 1, X 10, X 100 and X 1000, and these are selected by the rotatably keyed wafer switch 136 which connects one of the resistances 148, 150, 152 or 154, as illustrated.

The probe leakage resistance is checked between the HI-Z and LO-Z connector or between either connector and ground.

Referring to FIG. 5, the indicator test circuit is basically equivalent to a capacitor decade box. The indicator circuit consists of eight precision capacitors 160, 162, 164, 166, 168, 170, 172 and 174, and provisions for connecting an external precision capacitor 176. A pair of wafer switches 178 and 180 which are keyed to each other, and also to switches 186 and 188, form a converter size simulator switch generally designated 189, which select the desired capacitor. The selected capacitor is imposed between a pair of indicator connectors 182 and 184 for suitable connection. The pair of mutually keyed wafer switches 186 and 188 serve to ground out the unselected capacitors to prevent interference, and are electrically connected to each other by leads between the corresponding numbered contact positions (1)–(4) and (8)–(12).

The switch 189 is shown in the position for selecting the precision capacitor. For clockwise rotation of the switch 189 the capacitances selected are as follows: 5 liters, converter empty; 5 liters, full; 10, empty; 10 full; 25, empty; 25, full; 75, empty; 75, full.

The internal precision capacitors 160, 162, 164, 166, 168, 170, 172 and 174, when properly connected by means of lines from jacks 182, 184, to 48, 50, simulate the empty and full capacitance that is normally a function of the converter probe. A different internal capacitance is selected for each position of Converter Size Simulator switch 189. This tests the reliability of the empty and full readings of the aircraft system indicator (not shown) upon the aircraft which carries the LOX converter. The simulator switch, when connected at the wafers to position (8), has the external precision capacitor 176 connected between the precision condenser HI–Z and LO–Z connectors 182, 184. The value of the precision capacitor is adjusted to simulate the various conditions of LOX tanks between the extremes of empty and full.

The Indicator Test Circuit has provision for checking the accuracy of the low level warning circuit of the aircraft LOX system indicator.

Simple functioning of the circuit is checked by observing a low level warning lamp 35 as the quantity gauge is caused to run down scale. This is accomplished by switching from full to empty on the Converter Size Simulator switch comprised of wafers 180, 182, 186 and 188. The lamp 35 should light as the specified cut-in point is passed.

If an accurate check of the cut-in point is desired, an external variable capacitor, for example 176, may be inserted. Varying this capacitor causes the quantity gauge to run down or up scale. The cut-in point is accurately checked by causing the gauge to vary slowly about the required cut-in point.

Switch 31 is provided with a pair of leads connected to plug 33. When connected to the aircraft's indicator, it replaces the aircraft's indicator test switch. When closed, it should cause the indicator to run downscale thus serving as a check on the indicator test switch circuitry.

Summarily, in operation, the empty-converter capacitance test is accomplished by first suitably connecting the HI–Z and LO–Z probe connectors 48 and 50 of the test unit to the jacks 182 and 184 (FIGS. 1a and 5) by means of jumpers setting the beforementioned Circuit Selector Switch means to the "Cap-Check" position, and setting the switch 52, by means of knob 63, to the "Empty-Cap-Check" position corresponding to the size of converter under test. The converter Size Simulator Switch 189 is set to the corresponding size in the "Empty" or "E" position, and switch 70, 71 is held at the BAL (the right hand) position of FIG. 3, while BAL potentiometer 90 adjusts the reading of meter 82 to zero. The switch 70, 71 is then held in the CAL (or left hand position) while the reading on meter 82 is adjusteed to read 1½% by means of CAL potentiometer 94.

The jumpers are then removed and the probe connecting connectors 48, 50 are connected to the HI–Z and LO–Z probes of the converter. The converter should be free of all liquid oxygen. With the switch 70 in the "Read" position, the reading on meter 82 should be ±1½% for an acceptable converter. The ±1½% limits are preferably defined by red limit lines on the meter 82.

The empty-converter resistance leakage test is accomplished by suitable connection of a pair of jumpers between the connectors 48, 50 and the appropriate HI–Z and LO–Z probes, respectively, of the converter to be tested. The Megohmmeter-Range Selector switch 137 is set to the "Zero-Calibrate" position (10), while potentiometer 140 is adjusted to cause the meter 128 to read zero. The Megohmmeter-Range Selector switch 137 is then set to the "Midscale Calibrate" position (12) while the wiper 156 of the Mid-Calibrate potentiometer 118 is adjusted so that meter 128 reads "Mid-Calibrate". The Circuit Selector Switch means (not shown) are not set to "HI–LO". The selector switch 137 is set to one of the "Range Selector" positions (2), (4), (6), or (8), corresponding respectively to ranges of resistance X 1, X 10, X 100 or X 1000, whichever results in a meter reading closest to mid-scale. The resulting reading on meter 128 is the leakage resistance which may be checked against the prescribed allowable converter leakage resistance. To check the leakage between HI–Z or LO–Z and ground, the Circuit Selector Switch means are set to the appropriate position and the last step is repeated. External resistances are similarly checked.

The Evaporation Loss test is performed on converters that have successfully passed the Empty Converter Capacitance and Resistance Leakage tests described. The Evaporation Loss test should be performed with the converter in the vented condition. The probes of the converter are suitably connected to the connectors 48, 50; and "Empty Capacitance Check-Evaporation Loss Check" selector switch 63 is set to correspond to the size of converter under test. Switch 70, 71 is held at BAL (in the right hand position) while meter 82 is adjusted to zero by means of BAL potentiometer 90. With the switch 70 in the center, or normal READ position, "Full Adjust" potentiometer 61 is set so as to cause meter 82 to read zero. When switch 70 is held in the (left hand) CAL position, CAL potentiometer 94 is adjusted to cause meter 82 to read +1½%. Switch 70 is then again set to the (center) READ position while "Full Adjust" potentiometer 61 is set to zero. After an interval has elapsed the elapsed time and percent loss as shown on the meter is noted. The minimum time allowed for a given percent loss for each converter size is listed. If, for a given percent loss, the elapsed time is equal or greater than the minimum elapsed time listed in the following table, the converter is acceptable; if the elapsed time is less than the minimum specified, the converter shows excessive loss.

ELAPSED TIME IN MINUTES FOR CONVERTER SIZE

| Percent loss | 2½ liters | 5 liters | 10 liters | 25 liters |
| --- | --- | --- | --- | --- |
| .2 | | | | 45 |
| .3 | | | 36 | 63 |
| .4 | | 29 | 48 | 90 |
| .5 | 23 | 36 | 60 | 113 |
| .6 | 27 | 43 | 72 | 135 |
| .7 | 32 | 50 | 84 | 158 |
| .8 | 36 | 58 | 96 | 180 |

Obviously, a similar chart may be provided for converters of still other sizes.

The aircraft indicator may be tested by connecting jumpers (not shown) from jacks 182, 184 to the aircraft system indicator (not shown) and setting the Converter Size Simulator switch 189 to the E (Empty) position (9), (11), (1) or (3), corresponding to the size converter being simulated, i.e., 5, 10, 25 or 75 liters respectively. The indicator should provide an Empty reading within prescribed tolerance limits. The knob 189 (switches 178, 180, 186, 188) is set to a F (Full position) (2), (4), (10) or (12) setting, corresponding to the size converter being simulated, i.e., 5, 10, 25 or 75 liters and the indicator should provide a reading within the prescribed tolerance.

Referring again to the resistance measuring section of the instrument, it is to be noted that tube 124 functions as a true cathode follower with substantially no grid current.

It will be noted that in the low ranges, switch 132 shorts out resistor 130 to compensate for grid current flow. This latter feature greatly minimizes low scale inaccuracy.

Terminals 26 and 27 are binding posts used for connection to external resistances to permit their measurement by the megohmmeter.

Terminals 37 and 39 are provided for the connection of external precision capacitors for the testing of indicators.

The foregoing detailed description has been given for clearness and understanding only, and no unnecessary limitations should be understood therefrom for modifications will be obvious to those skilled in the art.

What is claimed is:

1. A liquid oxygen converter testing apparatus comprising:
   (a) a transformer having a primary winding and two connected secondary windings;
   (b) circuit means connected to one of said secondary windings and including a plurality of standard capacitors each having a capacitance value corresponding to the capacitance of a converter to be tested, one of said capacitors being connected with one of said secondary windings;
   (c) test connector means connecting said circuit means to the other of said secondary windings and having means to be connected to one of a plurality of different-volume liquid-oxygen converters;
   (d) a zero-center meter system connecting the junction of said secondary windings with the junction of said circuit means and said test connector means and reading in plus and minus values;
   (e) voltage control means connected to said primary windings to vary the voltage across each secondary windings in proportion to the other; and
   (f) switching means for selectively changing the capacitor connected to said secondary windings, said switching means being connected to said voltage control means for varying the voltage across the windings in proportion to the impedance of said standard capacitor.

2. A test system for connection to the test probes of a liquid oxygen converter, comprising a housing, test terminals mounted in said housing said test terminals being connectible to the test probes, means in said housing for measuring the empty capacitance of the converter and the evaporation loss percentage of the converter when connected to said test terminals; means in said housing for measuring the insulation leakage resistance across the test probes and between each of the test probes and ground when connected to said test terminals; means in said housing for simulating empty, full and partially full capacitance conditions of said converter to functionally test a "liquid-oxygen quantity-remaining" indicator in an aircraft; and switching means in said housing for selectively connecting only one of the first two of said beforementioned means to said terminals; said leakage resistance measuring means including meter means having a scale, a plurality of standard resistors, input connector means connectible by said switching means to said test terminals, source means connected in series with said meter means, a reference resistor having a predetermined value relative to one of said standard resistors, multi-position switch circuit means for selectively connecting in one of its positions one of said standard resistors across said meter means and connecting said connector means in series with said meter means and said source means, said switch circuit means connecting in another position the one of said standard resistors across said meter means and connecting said reference resistor in series with said meter means and said source means, and control voltage means in series with the one of said standard resistors to vary the reading of the scale in said meter means.

3. A megohmmeter, comprising input terminals, meter means having a scale, a plurality of standard resistors, source means series connected with said meter means and forming therewith a series section, a reference resistor having a predetermined value relative to one of said standard resistors, selectively-operable multi-position switch means for connecting in a first position one of said standard resistors across said meter means and connecting said series section across said input terminals, said switch means in a second position selectively connecting the one standard resistor having the predetermined value relative to the reference resistor across the meter means and connecting said reference resistor across the input terminals, and variable voltage means connected in series with said standard resistors to vary the reading at the scale, whereby in the second position of the switch means the meter means may be set to a predetermined intermediate reading on the scale by said variable voltage means.

4. A megohmmeter as set forth in claim 3 wherein said meter means comprise an amplifier and a meter movement.

5. A liquid oxygen converter test system comprising, a housing; converter capacitance measurement means in said housing for measuring capacitance across test probes on a converter containing various quantities of liquid oxygen; resistance leakage measurement means in said housing for measuring the insulation leakage resistance between the test probes of the converter and between the individual probes and ground; and checking means in said housing connectible with said capacitance measuring means for electrically simulating the capacitance of the converter when filled to given levels of liquid oxygen; said converter capacitance measurement means including a capacitance bridge having a first pair of electrically connected legs each comprising one of a pair of transformer secondary windings and forming between them a junction, and a second pair of electrically connected legs forming a junction and comprising one of a plurality of standard capacitors and terminal means for connection to the test probes on the converter, meter means connected from the respective junction between said secondary windings to the junction of the test converter and the standard capacitor, a primary winding electrically linked with said secondary windings, and energizing source for said primary winding, variable resistance means connected between said source and said primary winding; and switch means for connecting into the bridge a selected one of said standard capacitors and for simultaneously varying the value of said resistance means to vary the voltage at said secondary windings in proportion to the impedance of said standard capacitor and thereby to change the bridge gain when said reference capacitors and converters are changed.

6. A capacitance bridge measuring device comprising, variable standard capacitance means, first voltage source means, test capacitance means, second voltage source means, said variable standard capacitance means and said first voltage source means and said test capacitance means and said second source means being connected as a bridge and forming two pairs of opposite junctions, reading means connected between one pair of junctions for indicating zero when the test capacitance means have a desired capacitance value relative to the standard capacitance means and to indicate a percentage of the desired capacitance value of the test capacitance means departs from the desired value, and control means for simultaneously varying the potentials of said first and second voltage source means as a function of the impedance of said variable standard capacitance means and in the same proportions.

(References on following page)

References Cited in the file of this patent

UNITED STATES PATENTS

| | | | |
|---|---|---|---|
| 2,188,628 | Freystedt | Jan. 30, | 1940 |
| 2,190,488 | Schnoll | Feb. 13, | 1940 |
| 2,712,112 | Weeks | June 28, | 1955 |
| 2,718,620 | Howe | Sept. 20, | 1955 |
| 2,800,629 | Tagg | July 23, | 1957 |
| 2,841,765 | Harold | July 1, | 1958 |
| 2,874,354 | Bell | Feb. 17, | 1959 |
| 2,876,417 | Winram | Mar. 3, | 1959 |
| 2,879,471 | Erath | Mar. 24, | 1959 |
| 2,880,390 | Calvert | Mar. 31, | 1959 |
| 2,882,728 | Zito | Apr. 21, | 1959 |
| 2,995,704 | Norgaard | Aug. 8, | 1961 |

OTHER REFERENCES

Scroogie: "A Valve Megohmmeter," Wireless World, November 1953, pages 516–521.